(12) United States Patent
Hara

(10) Patent No.: US 10,059,838 B2
(45) Date of Patent: Aug. 28, 2018

(54) CURABLE COMPOSITION FOR HARD DISK DRIVE

(71) Applicant: KYORITSU CHEMICAL & CO., LTD., Tokyo (JP)

(72) Inventor: Yuta Hara, Chiba (JP)

(73) Assignee: KYORITSU CHEMICAL & CO., LTD., Tokyo (JP)

( * ) Notice: Subject to any disclaimer, the term of this patent is extended or adjusted under 35 U.S.C. 154(b) by 39 days.

(21) Appl. No.: 14/415,927

(22) PCT Filed: Jul. 18, 2013

(86) PCT No.: PCT/JP2013/069482
§ 371 (c)(1),
(2) Date: Jan. 20, 2015

(87) PCT Pub. No.: WO2014/014045
PCT Pub. Date: Jan. 23, 2014

(65) Prior Publication Data
US 2015/0166784 A1    Jun. 18, 2015

(30) Foreign Application Priority Data

Jul. 20, 2012  (JP) ................................. 2012-161469

(51) Int. Cl.
| | | |
|---|---|---|
| *C08L 63/10* | (2006.01) | |
| *C09J 4/00* | (2006.01) | |
| *G11B 5/48* | (2006.01) | |
| *C08G 59/32* | (2006.01) | |
| *B32B 37/12* | (2006.01) | |
| *B32B 38/00* | (2006.01) | |
| *G11B 5/127* | (2006.01) | |
| *C08G 59/24* | (2006.01) | |
| *C08G 59/56* | (2006.01) | |
| *C08L 63/00* | (2006.01) | |
| *C08K 5/07* | (2006.01) | |
| *C08L 33/12* | (2006.01) | |

(52) U.S. Cl.
CPC .............. *C08L 63/10* (2013.01); *B32B 37/12* (2013.01); *B32B 38/0008* (2013.01); *C08G 59/245* (2013.01); *C08G 59/3209* (2013.01); *C08G 59/56* (2013.01); *C08K 5/07* (2013.01); *C08L 33/12* (2013.01); *C08L 63/00* (2013.01); *C09J 4/00* (2013.01); *G11B 5/127* (2013.01); *G11B 5/4826* (2013.01); *B32B 2037/1253* (2013.01); *B32B 2457/00* (2013.01)

(58) Field of Classification Search
CPC ................ C08G 59/56; C08G 59/1245; C08G 59/3209; C08L 63/00; C08L 33/08; C08L 33/12; C08L 63/10

USPC .................................................. 522/100, 103
See application file for complete search history.

(56) References Cited

U.S. PATENT DOCUMENTS

| | | | | |
|---|---|---|---|---|
| 5,596,023 | A * | 1/1997 | Tsubota ............... | C08F 299/028 349/153 |
| 6,277,930 | B1 * | 8/2001 | Nishikawa ........... | C08G 59/184 522/100 |
| 6,517,744 | B1 * | 2/2003 | Hara ...................... | B29C 70/025 148/108 |
| 6,812,299 | B2 * | 11/2004 | Sato ....................... | C08F 283/10 257/E23.077 |
| 7,396,885 | B2 * | 7/2008 | Sato ....................... | C08F 283/10 525/486 |
| 7,410,673 | B2 * | 8/2008 | Sato ....................... | C08F 283/10 257/E23.077 |

FOREIGN PATENT DOCUMENTS

| | | |
|---|---|---|
| CN | 101617267 A | 12/2009 |
| JP | 2009-162842 A | 7/2009 |
| JP | 2009-295208 A | 12/2009 |
| JP | 2010-013507 A | 1/2010 |
| JP | 2011-181704 A | 9/2011 |
| WO | 2010/002008 A1 | 1/2010 |

OTHER PUBLICATIONS

International Search Report issued in PCT/JP2013/069482 dated Aug. 27, 2013 (2 pages).
Written Opinion of the International Searching Authority issued in PCT/JP2013/069482 dated Aug. 27, 2013 (8 pages).
Office Action issued in corresponding Japanese Application No. 2014-525858 with English translation dated Jul. 4, 2017 (6 pages).
Office Action issued in corresponding Chinese Application No. 201380038035.8 dated Mar. 5, 2018 (8 pages).

* cited by examiner

*Primary Examiner* — Sanza L. McClendon
(74) *Attorney, Agent, or Firm* — Osha Liang LLP

(57) ABSTRACT

The present invention provides a curable composition for a hard disk drive, the composition comprising: a compound (component A1) having an ethylenically unsaturated group and having no epoxy group and a compound (component A2) having an ethylenically unsaturated group and an epoxy group, or the component A2 and a compound (component A3) having an epoxy group and having no ethylenically unsaturated group, or the component A1 and the component A3, or the component A1, the component A2, and the component A3, or the component A2; a photo-radical polymerization initiator (component B); and a compound (component C) capable of causing the epoxy group to undergo polymerization, and a method for producing a hard disk drive, which comprises the step of bonding a part to a magnetic head portion using the composition.

20 Claims, No Drawings

CURABLE COMPOSITION FOR HARD DISK DRIVE

FIELD OF THE INVENTION

The present invention relates to a curable composition for a hard disk drive.

BACKGROUND ART

In the assembly of a hard disk, a step for fixing portions around a magnetic head using a bonding agent is indispensable, and, for example, there are steps, such as fixing a piezoelectric device, fixing a magnetic head, and fixing a magnetic head to a suspension {head gimbal assembly (HGA)}. With respect to the bonding agent used in these steps, for example, patent document 1 discloses a photocurable composition comprising a radically polymerizable monomer (which produces a polymer having a glass transition temperature of 25° C. or higher), such as (a)an (meth)acrylate compound, and patent document 2 discloses a thermosetting epoxy bonding agent having a glass transition temperature higher than 85° C.

PRIOR ART REFERENCES

Patent Documents

Patent document 1: Japanese Unexamined Patent Publication No. 2011-181704
Patent document 2: Japanese Unexamined Patent Publication No. 2009-295208

SUMMARY OF THE INVENTION

Problems to be Solved by the Invention

However, the portions around a magnetic head have a portion to be bonded such that when the photocurable composition applied to the portion to be bonded is irradiated with a light, a shaded area is caused in the portion to be bonded. Therefore, it is difficult to cure the whole of the composition applied to the portion to be bonded only by energy irradiation so as to achieve a desired glass transition temperature without causing an uncured portion. On the other hand, as the step for the assembly of a hard disk drive is becoming finer and further increased in the speed, it becomes difficult to surely obtaining the bonding stability for a portion to be bonded by bonding only using curing by heating.

A task of the present invention is to provide a curable composition for a hard disk drive, which exhibits excellent bonding stability even for the portion to be bonded in a hard disk drive in which a shaded area can be caused when irradiated with a light, and a method for producing a hard disk drive, which comprises the step of bonding a part to a magnetic head portion using the above composition.

Means to Solve the Problems

The present invention is directed to:
(1) a curable composition for a hard disk drive, wherein the composition comprises: a compound (component A1) having an ethylenically unsaturated group and having no epoxy group and a compound (component A2) having an ethylenically unsaturated group and an epoxy group, or the component A2 and a compound (component A3) having an epoxy group and having no ethylenically unsaturated group, or the component A1 and the component A3, or the component A1, the component A2, and the component A3, or the component A2;
a photo-radical polymerization initiator (component B); and
a compound (component C) capable of causing the epoxy group to undergo polymerization, wherein the component C is an amine adduct, and
(2) a method for producing a hard disk drive, wherein the method comprises the step of bonding a part to a magnetic head portion using the curable composition for a hard disk drive according to item (1) above.

Effect of the Invention

In the present invention, there can be provided a curable composition for a hard disk drive, which exhibits excellent bonding stability even for the portion to be bonded in a hard disk drive in which a shaded area can be caused when irradiated with a light, and a method for producing a hard disk drive, which comprises the step of bonding a part to a magnetic head portion using the above composition.

BEST MODE FOR CARRYING OUT THE INVENTION

[Components A1, A2, and A3]
With respect to the curable composition for a hard disk drive (hereinafter, frequently referred to as "the composition of the present invention"), in bonding or fixing parts for a hard disk drive, preferably parts for a magnetic head portion using the curable composition, from the viewpoint of maintaining the accuracy of bonding or fixing the parts at a temperature upon the assembly of a hard disk drive, which is considered to be increased to a temperature as high as about 70° C., and surely obtaining a high glass transition temperature of the composition obtained after cured (hereinafter, these properties are frequently referred to as "bonding stability"), it is necessary that the curable compound contained in the composition of the present invention have both an ethylenically unsaturated group which undergoes photopolymerization due to radicals generated from a photo-radical initiator when suffering energy irradiation to cure the composition, and an epoxy group which undergoes polymerization due to an amine adduct and a thermo-radical initiator to cure the composition.

Specifically, the composition of the present invention comprises a compound (component A1) having an ethylenically unsaturated group and having no epoxy group and a compound (component A2) having an ethylenically unsaturated group and an epoxy group; or component A2 and a compound (component A3) having an epoxy group and having no ethylenically unsaturated group; or component A1 and component A3; or component A1, component A2, and component A3; or component A2.

Component A1 is preferably a radically polymerizable unsaturated monomer or oligomer having at least one ethylenically unsaturated group, namely, at least one radically polymerizable monomer and/or oligomer selected from the group consisting of a radically polymerizable unsaturated monomer or oligomer having an ethylenically unsaturated group (hereinafter, frequently referred to as "component A1-1"), a multifunctional radically polymerizable unsaturated monomer or oligomer having two ethylenically unsaturated groups (hereinafter, frequently referred to as "component A1-2"), a multifunctional radically polymerizable unsaturated monomer or oligomer having three or more ethylenically unsaturated groups (hereinafter, frequently referred to as "component A1-3"), and other multifunctional radically polymerizable oligomers and polymers (hereinafter, frequently referred to as "component A1-4"). Component A1 is more preferably (a)an (meth)acrylate compound.

From the viewpoint of surely obtaining a viscosity of the photocurable resin composition of the present invention and a hardness and flexibility of the film formed from the composition, component A1-1 is preferably at least one compound selected from the group consisting of hydroxyethyl (meth)acrylate, benzyl (meth)acrylate, tetrahydrofurfuryl (meth)acrylate, isooctyl (meth)acrylate, cyclohexyl (meth)acrylate, isobornyl (meth)acrylate, dicyclopentanyl (meth)acrylate, cyclohexyl (meth)acrylate, dicyclopentanyloxyethyl (meth)acrylate, isomyristyl (meth)acrylate, lauryl (meth)acrylate, tert-butyl (meth)acrylate, and diethylene glycol monoethyl ether (meth)acrylate, more preferably at least one compound selected from the group consisting of isobornyl (meth)acrylate, tetrahydrofurfuryl (meth)acrylate, dicyclopentanyl (meth)acrylate, and cyclohexyl (meth)acrylate.

From the viewpoint of surely obtaining a viscosity of the photocurable resin composition of the present invention and a hardness of the film formed from the composition, component A1-2 is preferably at least one compound selected from the group consisting of tricyclodecanedimethanol di(meth)acrylate, dimethyloldicyclopentane di(meth)acrylate, EO-modified 1,6-hexanediol di(meth)acrylate, EO-modified bisphenol A di(meth)acrylate, modified bisphenol A di(meth)acrylate, polyester di(meth)acrylate, polyethylene glycol di(meth)acrylate, silicone di(meth)acrylate, and triethylene glycol di(meth)acrylate, more preferably dimethyloldicyclopentane di(meth)acrylate and/or modified bisphenol A di(meth)acrylate. Of these, modified bisphenol A (meth)acrylate is preferred, and, for example, LIGHT-ACRYLATE BP-4EAL (diacrylate of ethylene oxide (EO) addition product of bisphenol A), LIGHT-ACRYLATE BP-4PA (diacrylate of propylene oxide (PO) addition product of bisphenol A), EPOXY-ESTER 3000A (acrylic acid addition product of bisphenol A diglycidyl ether), and EPOXY-ESTER 3000MK (methacrylic acid addition product of bisphenol A diglycidyl ether) are commercially available from Kyoeisha Chemical Co., Ltd.

From the viewpoint of surely obtaining a viscosity of the photocurable resin composition of the present invention and a hardness and flexibility of the film formed from the composition, component A1-3 is preferably at least one compound selected from the group consisting of glycerol tri(meth)acrylate, EO-modified glycerol tri(meth)acrylate, PO-modified glycerol tri(meth)acrylate, pentaerythritol triacrylate, dipentaerythritol hexa(meth)acrylate, and pentaerythritol tetra(meth)acrylate, more preferably EO-modified glycerol tri(meth)acrylate and/or dipentaerythritol hexa (meth)acrylate.

Component A2 is preferably a monomer or oligomer having at least one ethylenically unsaturated group and at least one epoxy group, and examples include a modified compound of a compound having an epoxy group by a compound having an ethylenically unsaturated group, and a modified compound of a compound having an ethylenically unsaturated group by a compound having an epoxy group. More preferred is (a)an (meth)acrylic acid-modified compound of an epoxy compound, and examples include allyl glycidyl ether, glycidyl (meth)acrylate, and 4-hydroxybutyl (meth)acrylate glycidyl ether, and, for example, LIGHT-ESTER G (glycidyl methacrylate) is commercially available from Kyoeisha Chemical Co., Ltd.

Component A3 is a monomer or oligomer having at least one epoxy group, preferably at least one compound selected from the group consisting of a bisphenol A epoxy compound, a bisphenol F epoxy compound, a bisphenol AD epoxy compound, a phenolic novolak epoxy compound, a naphthalene epoxy compound, and a hydrogenated compound thereof and an alicyclic epoxy compound, more preferably at least one compound selected from the group consisting of a bisphenol A epoxy compound, a bisphenol F epoxy compound, and a naphthalene epoxy compound, further preferably a bisphenol A epoxy compound.

Specific examples of bisphenol A epoxy compounds include EPICLON 850S, EXA-850CRP, 860, 1055, manufactured by DIC Corporation. Specific examples of hydrogenated bisphenol A epoxy compounds include KRM-2408, manufactured by ADEKA CORPORATION; and jER (registered trademark) YX8034, manufactured by Mitsubishi Chemical Corporation. Specific examples of bisphenol F epoxy compounds include EPICLON 830S, EXA-830LVP, manufactured by DIC Corporation. Specific examples of naphthalene epoxy compounds include EPICLON HP-4032D, HP-4700, manufactured by DIC Corporation. Specific examples of phenolic novolak epoxy compounds include EPICLON N-730A, N-740, N-770, manufactured by DIC Corporation. Specific examples of cresol novolak epoxy compounds include EPICLON N-660, N-670, manufactured by DIC Corporation.

Specific examples of alicyclic epoxy compounds include 3',4'-epoxycyclohexylmethyl-3,4-epoxycyclohexanecarboxylate {Celloxide (registered trademark) 2021P, manufactured by Daicel Corporation}, 1,2:8,9-diepoxylimonene (Celloxide 3000, manufactured by Daicel Corporation), 1,2-epoxy-4-vinylcyclohexane (Celloxide 2000, manufactured by Daicel Corporation), and 1,2-epoxy-4-(2-oxiranyl)cyclohexane addition product of 2,2-bis(hydroxymethyl)-1-butanol (EHPE 3150, manufactured by Daicel Corporation).

[Component B]

The curable composition of the present invention contains a photo-radical initiator (component B) as a radical generation source used upon causing components A1 and A2 to undergo photopolymerization.

Component B can be appropriately selected according to components A1 and A2 used in the curable composition of the present invention. Examples of component B include acylphosphinic acid esters, such as methyl 2,4,6-trimethylbenzoylphenylphosphinate; acylphosphine oxides, such as bis(2,4,6-trimethylbenzoyl)phenylphosphine oxide (IRGACURE 819); acetophenone compounds, such as 1-[4-(2-hydroxyethoxy)phenyl]-2-hydroxy-2-methyl-1-propan-1-one (IRGACURE 2959), 2,2-dimethoxy-1,2-diphenylethan-1-one (IRGACURE 651), 2-methyl-1-[4-(methylthio) phenyl]-2-morpholinopropan-1-one (IRGACURE 907), 2-hydroxy-2-methyl-1-phenyl-propan-1-one (DAROCUR 1173), 1-hydroxycyclohexyl phenyl ketone (IRGACURE 184), 4'-phenoxy-2,2-dichloroacetophenone, 2,2-diethoxyacetophenone, and 1-(4-isopropylphenyl)-2-hydroxy-2-methylpropan-1-one; and benzophenone compounds, such as benzophenone, methyl benzoylbenzoate, 4-phenylbenzophenone, hydroxybenzophenone, 3,3'-dimethyl-4-methoxybenzophenone, and diphenoxybenzophenone.

[Component C]

With respect to the curable composition of the present invention applied to the portion to be bonded present in a shaded area which cannot be expected to suffer energy irradiation, from the viewpoint of causing the epoxy groups in components A2 and A3 to undergo polymerization even at a temperature as low as preferably 100° C. or lower, more preferably 80° C. or lower, to cure the composition, the curable composition of the present invention contains an amine adduct (component C) as a curing agent for components A2 and A3. As component C, there can be used an amine adduct commercially available, for example, ADEKA HARDENER EH5030S, manufactured by ADEKA CORPORATION, or AMICURE PN-23, AMICURE PN-30, AMICURE MY-24, AMICURE MY-H, manufactured by Ajinomoto Fine-Techno Co., Inc.

With respect to the curable composition of the present invention applied to the portion to be bonded present in a shaded area which cannot be expected to suffer energy irradiation, from the viewpoint of causing the epoxy groups to undergo polymerization even at a temperature as low as preferably 100° C. or lower, more preferably 80° C. or lower, to cure the composition, it is preferred that the curable composition of the present invention further comprises an imidazole compound and/or a tertiary amine compound (component D) which can serve as a catalyst for curing the epoxy groups. For example, 2-heptadecylimidazole (C17Z), 2-undecylimidazole (C11Z), 2-methylimidazole (2MZ-H), and 1,2-dimethylimidazole (1.2DMZ) are commercially available from Shikoku Corporation.

With respect to the curable composition of the present invention applied to the portion to be bonded present in a shaded area which cannot be expected to suffer energy irradiation, from the viewpoint of causing the ethylenically unsaturated groups to undergo polymerization by heating to cure the composition, it is preferred that the curable composition of the present invention further comprises a thermoradical polymerization initiator (component E).

Component E is preferably an organic peroxide (for example, a ketone peroxide, a peroxyketal, a diacyl peroxide, a peroxyester, or a peroxydicarbonate). For example, t-hexyl peroxy-2-ethyl hexanoate {PERHEXYL (registered trademark) O} and t-butyl peroxy-2-ethyl hexanoate {PERBUTYL (registered trademark) O} are commercially available from NOF Corporation.

[Other Components]

In the curable composition of the present invention, from the viewpoint of reducing the stress caused by shrinkage on curing, it is preferred that a filler is added to the composition. Examples of fillers include an inorganic filler and an organic filler. From the viewpoint of preventing the removal of a filler from the compound so as to suppress an adverse effect on a disk or a magnetic head, an organic filler is preferred. Examples of inorganic fillers include talc, silica, and mica. Examples of organic fillers include polyacrylate particles, core-shell type polyacrylate particles, polystyrene particles, acryl-styrene copolymer particles, polypropylene particles, and polyethylene particles.

From the viewpoint of obtaining the insulation properties needed when bonding parts for the assembly of a hard disk drive and incorporating a nonreactive component to further suppress outgassing, the particles constituting the filler preferably have an average particle diameter of 0.5 to 150 µm, more preferably 1 to 100 µm, further preferably 5 to 50 µm. The average particle diameter of the particles constituting the filler is measured by means of a laser diffraction/scattering type particle diameter distribution measurement apparatus, manufactured by HORIBA, Ltd. (for example, Partica LA-950V2, manufactured by HORIBA, Ltd.).

The curable composition of the present invention can contain an additive, such as a silane coupling agent or a photosensitizer, in such an amount that the effects of the present invention can be obtained.

From the viewpoint of achieving stability of the strength of the cured product obtained from the curable composition of the present invention, the silane coupling agent is preferably at least one silane coupling agent selected from the group consisting of tetraalkoxysilanes, such as tetramethoxysilane, tetraethoxysilane, tetrapropoxysilane, tetraisopropoxysilane, tetrabutoxysilane, dimethoxydiethoxysilane, dimethoxydiisopropoxysilane, diethoxydiisopropoxysilane, and diethoxydibutoxysilane; trialkoxysilanes, such as methyltrimethoxysilane, methyltriethoxysilane, methyltriisopropoxysilane, ethyltriethoxysilane, ethyltributoxysilane, cyclohexyltriethoxysilane, phenyltriisopropoxysilane, vinyltrimethoxysilane, 3-glycidoxypropyltrimethoxysilane, and 3-methacryloyloxypropyltrimethoxysilane; and dialkoxysilanes, such as dimethyldimethoxysilane, dimethyldiethoxysilane, diethyldiethoxysilane, diethyldibutoxysilane, and phenylethyldiethoxysilane, further preferably at least one trialkoxysilane silane coupling agent selected from the group consisting of methyltrimethoxysilane, methyltriethoxysilane, methyltriisopropoxysilane, ethyltriethoxysilane, ethyltributoxysilane, cyclohexyltriethoxysilane, phenyltriisopropoxysilane, vinyltrimethoxysilane, 3-glycidoxypropyltrimethoxysilane, and 3-methacryloyloxypropyltrimethoxysilane, further preferably 3-glycidoxypropyltrimethoxysilane.

[Curable Composition of the Present Invention]

With respect to the portion to be bonded in a hard disk drive in which a shaded area can be caused when the curable composition of the present invention is irradiated with a light, from the viewpoint of quickly bonding or fixing the curable composition of the present invention through the mechanism of polymerization other than photopolymerization to surely obtain the bonding stability for the portion to be bonded, the weight ratio of the total of component A1 and component A2 to the total of component A2 and component A3 {(A1+A2)/(A2+A3)} in the curable composition of the present invention is preferably 80/20 to 1/99, more preferably 70/30 to 3/97, further preferably 40/60 to 5/95.

The weight ratio of the total of component A1 and component A2 to the total of component A2 and component A3 can be controlled to be in a desired range by appropriately selecting the combination of components A1, A2, and A3 and changing the formulation of the combination. For example, with respect to the combination of component A1 and component A3, with respect to component A2 (the weight ratio of an ethylenically unsaturated group to an epoxy group can be controlled by appropriately changing the degree of modification of the compound of component A2 by a compound having an ethylenically unsaturated group), with respect to the combination of component A1 and component A2, and with respect to the combination of component A2 and component A3, the weight ratio of an ethylenically unsaturated group to an epoxy group can be controlled by appropriately changing the formulation of the components.

From the same viewpoint as mentioned above, in the curable composition of the present invention, the weight ratio of the total of component A1 and component A2 to component B {(A1+A2)/B} is preferably 99.9/0.1 to 90/10, more preferably 99.5/0.5 to 95/5. In the curable composition of the present invention, the molar ratio of the epoxy group to component C (epoxy group/component C) is preferably 75/25 to 45/55, more preferably 65/35 to 45/55. From the viewpoint of appropriately controlling the balance between photopolymerization and the mechanism of polymerization other than photopolymerization according to, for example, the material for or size of the portion to be bonded, a preferred weight ratio (ethylenically unsaturated group/component B) and a preferred molar ratio (epoxy group/component C) can be employed appropriately in a combination.

With respect to the curable composition of the present invention applied to the portion to be bonded present in a shaded area which cannot be expected to suffer energy irradiation, from the viewpoint of causing the epoxy groups to undergo polymerization even at a temperature as low as preferably 100° C. or lower, more preferably 80° C. or lower, to cure the composition, when using component D, the weight ratio of the total of component A2 and component A3 to component D {(A2+A3)/D} in the curable composition of the present invention is preferably 99.5/0.5 to 90/10, more preferably 98/2 to 90/10, further preferably 96/4 to 92/8.

With respect to the curable composition of the present invention applied to the portion to be bonded present in a shaded area which cannot be expected to suffer energy irradiation, from the viewpoint of causing the ethylenically unsaturated groups to undergo polymerization by heating to cure the composition, when using component E, the weight ratio of the total of component A1 and component A2 to component E {(A1+A2)/E} in the curable composition of the present invention is preferably 99.5/0.5 to 90/10, more preferably 99/1 to 90/10, further preferably 98/2 to 96/4.

In accordance with a rapid increase of the recording capacity per hard disk (platter) in recent years, the recording density is required to be improved, and hence the accuracy of positioning the magnetic head is further improved. For improving the accuracy of positioning the magnetic head, for example, in addition to the conventional motor control, a piezoelectric device is mounted, and thus parts of the portion around the magnetic head for a hard disk drive are becoming complicated. For this reason, the bonding agent used for fixing these parts is required to be able to strongly fix the parts with accuracy in an environment having a temperature in the apparatus increased to a temperature as high as about 70° C. even in the case where a shaded area is caused in the portion to be bonded when the photocurable composition applied to the portion to be bonded is irradiated with a light.

From the viewpoint of satisfying the above-mentioned requirements, the curable composition of the present invention preferably has the physical properties mentioned below.

With respect to the curable composition of the present invention, the composition obtained after cured preferably has a glass transition temperature of 70 to 160° C., more preferably 80 to 150° C., further preferably 90 to 140° C., still preferably 90 to 130° C. The glass transition temperature is obtained by making a DMA measurement by means of a DMA measurement apparatus (DMS 6100, manufactured by SII Nano Technology Inc.) and determining a peak value of tan δ at 1 Hz.

From the viewpoint of positioning of the magnetic head at a temperature of the environment in which the hard disk drive is operated, a change ratio of the elastic modulus after curing the curable composition of the present invention is preferably 0 to 90%, more preferably 0 to 50%, further preferably 0 to 30%. The elastic modulus is obtained by making a DMA measurement by means of a DMA measurement apparatus (DMS 6100, manufactured by SII Nano Technology Inc.) to determine a storage elastic modulus in the temperature elevation at 2° C./minute from 25° C. to 80° C., and making a calculation using the following formula.

Change ratio of elastic modulus=100×{(Elastic modulus at 25° C.)−(Elastic modulus at 80° C.)}/(Elastic modulus at 25° C.)

From the viewpoint of applying the curable composition of the present invention with accuracy, the viscosity of the curable composition of the present invention is preferably 1,000 to 50,000 mPa·s, more preferably 5,000 to 50,000 mPa·s, further preferably 8,000 to 50,000 mPa·s, still preferably 8,000 to 40,000 mPa·s, yet preferably 8,000 to 15,000 mPa·s. The viscosity is measured using a viscometer (RC-215, manufactured by Toki Sangyo Co., Ltd.) under conditions using a No. 3°×R14 rotor at 10 rpm and at 25±1° C.

In the curable composition of the present invention, the total amount of components A1, A2, A3, B, and C is 80 to 100% by weight. The above-mentioned physical properties of the curable composition of the present invention can be controlled by appropriately changing the formulation of components A1, A2, A3, B, and C (for example, with respect to the glass transition temperature, increasing or decreasing component C relative to the epoxy group), preferably further including components D and E. Specifically, from the viewpoint of obtaining the preferred physical properties of the curable composition of the present invention, it is preferred that the weight ratio of the total of component A1 and component A2 to the total of component A2 and component A3 {(A1+A2)/(A2+A3)} in the curable composition of the present invention, the weight ratio of the total of component A1 and component A2 to component B {(A1+A2)/B} in the curable composition of the present invention, the molar ratio of the epoxy group to component C (epoxy group/C) in the curable composition of the present invention, the weight ratio of the epoxy group to component D {(A2+A3)/D} in the curable composition of the present invention, and the weight ratio of the total of component A1 and component A2 to component E {(A1+A2)/E} in the curable composition of the present invention are within the above-mentioned respective preferred ranges.

[Method for Producing a Hard Disk Drive]

The curable composition of the present invention can be used in bonding a part to a magnetic head portion for a hard disk. Therefore, in a method for producing a hard disk drive, wherein the method comprises the step of bonding portions around a magnetic head in a hard disk drive, when the curable composition of the present invention is used in bonding portions around the magnetic head, for example, in fixing a piezoelectric device, fixing a magnetic head, or fixing a magnetic head to a suspension {head gimbal assembly (HGA)}, preferably in fixing a piezoelectric device, there can be produced a hard disk drive having high quality such that the part is bonded to the magnetic head while satisfactorily securing the bonding stability, so that the occurrence of a reading or writing error is suppressed under the control of positioning the magnetic head with an increased accuracy.

When bonding or fixing portions around a magnetic head using the curable composition of the present invention, after the curable composition of the present invention is applied to the portion to be bonded, the composition is irradiated with energy at an intensity of preferably 500 to 5,000 mJ/cm$^2$, more preferably 1,000 to 3,000 mJ/cm$^2$, further preferably 1,000 to 1,500 mJ/cm$^2$, so as to surely achieve excellent bonding stability. From the viewpoint of further improving the productivity, the curable composition applied is prefixed by irradiation with energy at the above-mentioned intensity, and then fully fixed by heating at preferably 80 to 140° C., more preferably 90 to 130° C., further preferably 100 to 120° C.

EXAMPLES

The curable compositions in Examples of the present invention were individually produced using the following raw materials.

(1) Component A1: LIGHT-ACRYLATE BP-4EAL (manufactured by Kyoeisha Chemical Co., Ltd.)

(2) Component A2: Partial-methacrylate bisphenol A epoxy compound (KR-1; see Synthesis Example 1 below)

(3) Component A3: EPICLON (registered trademark) EXA-850CRP (bisphenol A epoxy compound, manufactured by DIC Corporation)

Component A3: EPICLON (registered trademark) EXA-830LVP (bisphenol F epoxy compound, manufactured by DIC Corporation)

Component A3: EPICLON (registered trademark) N-730A (phenolic novolak epoxy compound, manufactured by DIC Corporation)

Component A3: EPICLON (registered trademark) HP-4032D (naphthalene epoxy compound, manufactured by DIC Corporation)

(4) Component B: IRGACURE 184 (1-hydroxycyclohexyl phenyl ketone, manufactured by BASF Japan Ltd.)

(5) Component C: ADEKA HARDENER (registered trademark) EH5030S (manufactured by ADEKA CORPORATION)

(6) Component D: Curezol (registered trademark) C17Z (manufactured by Shikoku Corporation)

(7) Component E: PERBUTYL (registered trademark) 0 (manufactured by NOF Corporation)

Synthesis Example 1

Synthesis of KR-1

A 500-ml four-necked glass flask equipped with a stirrer, an air introducing pipe, a thermometer, and a reflux condenser was prepared, and 340 g (2.0 equivalent/epoxy group) of a bisphenol A epoxy resin; EPICLON (registered trademark) EXA-850CRP (manufactured by DIC Corporation), 90.4 g (1.0 equivalent) of methacrylic acid, 0.5 g (1.9 milli-equivalent) of TPP (triphenylphosphine) (manufactured by Tokyo Chemical Industry Co., Ltd.), and 25 mg of hydroquinone and 100 mg of p-methoxyphenol as a polymerization inhibitor were mixed together, and the resultant mixture was stirred at 100° C. to effect a reaction until the acid value became 1.0 KOH mg/g or less. After completion of the reaction, the resultant reaction mixture was subjected to oxidation treatment at 80° C. for 2 hours, while introducing air into the mixture, to obtain a partial-methacrylate bisphenol A epoxy compound (KR-1).

Examples 1 to 6 and Comparative Example 1

In accordance with the weight for formulation shown in Table 1, the components were placed in a blending vessel (NO. 300 (manufactured by Kinki Yoki Co., Ltd.); capacity: 300 ml; made of polyethylene) and stirred by means of a stirrer {RW28 (manufactured by IKA); 600 rpm} in an environment at room temperature until the resultant mixture became transparent to prepare the curable compositions in Examples 1 to 6 and the curable composition in Comparative Example 1. In each of Examples 1 to 6 and Comparative Example 1, the room temperature for the operation was 23° C.

[Curing Conditions]

The curable compositions in Examples 1 to 5 and Comparative Example 1 were individually subjected to energy irradiation at UV 6,000 mJ/cm$^2$ using UB-031-A/BM-E1 metal halide lamp M06-I31, manufactured by EYE GRAPHICS Co., Ltd. Then, the resultant curable compositions of the present invention in Examples 1 to 4 were individually subjected to heating at 120° C. for one hour. The curable composition of the present invention in Example 6 was subjected only to heating at 120° C. for one hour. Thus, the respective cured products were obtained from the curable compositions in Examples 1 to 6 and Comparative Example 1.

[Evaluation Conditions]

With respect to each of the curable compositions in Examples 1 to 6, a viscosity was measured, and, with respect to each of the respective cured products obtained from the curable compositions in Examples 1 to 6 and Comparative Example 1, a glass transition temperature and a change ratio of elastic modulus were measured, and the results are shown in Table 1.

[Table 1]

TABLE 1

| Curable composition | | Weight for formulation | Example 1 | Example 2 | Example 3 | Example 4 | Example 5 | Example 6 | Comparative example 1 |
|---|---|---|---|---|---|---|---|---|---|
| Component A1 | LIGHT-ACRYLATE BP-4EAL | g | 20.0 | 20.0 | 20.0 | 20.0 | 20.0 | 20.0 | 100.0 |
| Component A3 | EPICLON EXA-850CRP | g | 80.0 | 80.0 | 80.0 | 80.0 | 80.0 | 80.0 | |
| Component B | IRGACURE 184 | g | 0.50 | 0.50 | 0.50 | 0.50 | 0.50 | 0.50 | 2.00 |
| Component C | ADEKA HARDENER EH5030S | g | 30.0 | 30.0 | 45.0 | 60.0 | 25.0 | 25.0 | |
| Component D | Curezol C17Z | g | | 5.00 | | | 5.00 | 0.50 | |
| Component E | PERBUTYL O | g | 0.50 | | 0.50 | 0.50 | 0.50 | 5.00 | |
| | Light irradiation | | Done | Done | Done | Done | Done | None | Done |
| | Heating | | Done | Done | Done | Done | None | Done | None |
| Physical properties | Viscosity (mPa · s) | | 8460 | 10150 | 16190 | 41200 | 9500 | 9500 | 1050 |
| | Glass transition temperature (° C.) | | 73.1 | 119.3 | 124.6 | 132.8 | 101.2 | 115.4 | 64.0 |
| | Elastic modulus at 25° C. | | $2.90 \times 10^9$ | $3.20 \times 10^9$ | $3.50 \times 10^9$ | $3.40 \times 10^9$ | $2.80 \times 10^9$ | $3.28 \times 10^9$ | $2.44 \times 10^9$ |
| | Elastic modulus at 80° C. | | $6.80 \times 10^7$ | $2.30 \times 10^9$ | $1.80 \times 10^9$ | $2.10 \times 10^9$ | $2.20 \times 10^9$ | $2.19 \times 10^9$ | $5.60 \times 10^7$ |
| | Change ratio of elastic modulus (%) | | 98 | 30 | 47 | 38 | 21 | 33 | 98 |

Examples 7 to 14

In accordance with the weight for formulation shown in Table 2, the curable compositions in Examples 7 to 14 were individually prepared in the same manner as in Example 1. Further, the respective cured products were obtained from the curable compositions in Examples 7 to 14 under the same curing conditions as those in Example 1. Further, under the same evaluation conditions as those in Example 1, a viscosity was measured with respect to each of the curable compositions in Examples 7 to 14, and a glass transition temperature and a change ratio of elastic modulus were measured with respect to each of the respective cured products obtained from the curable compositions in Examples 7 to 14, and the results are shown in Table 2.

[Table 2]

TABLE 2

| Curable composition | | Weight for formulation | Example 7 | Example 8 | Example 9 | Example 10 | Example 11 | Example 12 | Example 13 | Example 14 |
|---|---|---|---|---|---|---|---|---|---|---|
| Component A1 | LIGHT-ACRYLATE BP-4EAL | g | 40 | | 40 | 40 | 40 | 40 | 10 | 2.5 |
| Component A2 | KR-1 | g | 40 | 40 | | | | | 30 | 2.5 |
| Component A3 | EPICLON EXA-850CRP | g | | 40 | 40 | | | | 30 | 92.5 |
| Component A3 | EPICLON EXA-830LVP | g | | | | 40 | | | | |
| Component A3 | EPICLON N-730A | g | | | | | 40 | | | |
| Component A3 | EPICLON HP-4032D | g | | | | | | 40 | | |
| Component B | IRGACURE 184 | g | 3 | 3 | 3 | 3 | 3 | 3 | 3 | 3 |
| Component C | ADEKA HARDENER EH5030S | g | 15 | 30 | 40 | 45 | 20 | 50 | 30 | 60 |
| Physical properties | Viscosity (mPa · s) | | 9240 | 39510 | 12810 | 13170 | 21160 | 37920 | 32300 | 39670 |
| | Glass transition temperature (° C.) | | 92.0 | 119.9 | 81.5 | 90.5 | 81.6 | 77.2 | 111.4 | 125.9 |
| | Elastic modulus at 25° C. | | $3.57 \times 10^9$ | $2.79 \times 10^{10}$ | $2.99 \times 10^9$ | $3.88 \times 10^9$ | $4.29 \times 10^9$ | $2.48 \times 10^9$ | $2.69 \times 10^9$ | $2.89 \times 10^{10}$ |
| | Elastic modulus at 80° C. | | $1.01 \times 10^9$ | $1.52 \times 10^{10}$ | $5.31 \times 10^8$ | $1.39 \times 10^9$ | $7.44 \times 10^8$ | $3.93 \times 10^8$ | $1.45 \times 10^9$ | $1.72 \times 10^{10}$ |
| | Change ratio of elastic modulus (%) | | 72 | 46 | 82 | 64 | 83 | 84 | 46 | 40 |

The invention claimed is:

1. A curable composition for a hard disk drive, the composition comprising:
   a compound (component A1) having an ethylenically unsaturated group and having no epoxy group and a compound (component A2) having an ethylenically unsaturated group and an epoxy group, or the component A2 and a compound (component A3) having an epoxy group and having no ethylenically unsaturated group, or the component A1 and the component A3, or the component A1, the component A2, and the component A3, or the component A2;
   a photo-radical polymerization initiator (component B);
   a compound (component C) capable of causing the epoxy group to undergo polymerization, the component C being an amine adduct;
   an imidazole compound and/or a tertiary amine compound (component D); and
   a thermo-radical polymerization initiator (component E) selected from a ketone peroxide, a peroxyketal, a peroxyester, or a peroxydicarbonate.

2. The curable composition for a hard disk drive according to claim 1, wherein the composition obtained after cured has a glass transition temperature of 70 to 160° C.

3. The curable composition for a hard disk drive according to claim 1, which has a viscosity of 1,000 to 50,000 mPa·s.

4. The curable composition for a hard disk drive according to claim 1, wherein the component A1 is (a)an (meth) acrylate compound.

5. The curable composition for a hard disk drive according to claim 1, wherein the component A3 is at least one compound selected from the group consisting of a bisphenol A epoxy compound, a bisphenol F epoxy compound, a bisphenol AD epoxy compound, a phenolic novolak epoxy compound, a naphthalene epoxy compound, and an alicyclic epoxy compound.

6. The curable composition for a hard disk drive according to claim 1, wherein the component A2 is (a)an (meth) acrylic acid-modified compound of an epoxy compound.

7. The curable composition for a hard disk drive according to claim 1, wherein the weight ratio of the total of the component A1 and the component A2 to the total of the component A2 and the component A3 {(A1+A2)/(A2+A3)} is 40/60 to 5/95.

8. The curable composition for a hard disk drive according to claim 1, wherein the weight ratio of the total of the component A1 and the component A2 to the component B {(A1+A2)/B} is 99.9/0.1 to 90/10, and wherein the molar ratio of the epoxy group to the component C (epoxy group/ C) is 75/25 to 45/55.

9. The curable composition for a hard disk drive according to claim 1, wherein the total amount of the components A1, A2, A3, B, and C in the curable composition is 80 to 100% by weight.

10. A curable composition for a hard disk drive, the composition comprising:
   a compound (component A1) having an ethylenically unsaturated group and having no epoxy group and a compound (component AZ) having an ethylenically unsaturated group and an epoxy group, or the component A2 and a compound (component A3) having an epoxy group and having no ethylenically unsaturated group, or the component A1 and the component A3, or the component A1, the component A2, and the component A3, or the component A2;

a photo-radical polymerization initiator (component B);

a compound (component C) capable of causing the epoxy group to undergo polymerization, the component C being an amine adduct;

an imidazole compound (component D); and a thereto-radical polymerization initiator (component E) selected from a ketone peroxide, a peroxyketal, a peroxyester, or a peroxydicarbonate.

11. The curable composition for a hard disk drive according to claim 10, wherein the imidazole compound is at least one of 2-heptadecylimidazole, 2-undecylimidazole, 2-methylimidazole, and 1,2-dimethylimidazole.

12. The curable composition for a hard disk drive according to claim 10, wherein the composition obtained after cured has a glass transition temperature of 70 to 160° C.

13. The curable composition for a hard disk drive according to claim 10, which has a viscosity of 1,000 to 50,000 mPa·s.

14. The curable composition for a hard disk drive according to claim 10, wherein the component A1 is (a)an (meth)acrylate compound.

15. The curable composition for a hard disk drive according to claim 10, wherein the component A3 is at least one compound selected from the group consisting of a bisphenol A epoxy compound, a bisphenol F epoxy compound, a bisphenol AD epoxy compound, a phenolic novolak epoxy compound, a naphthalene epoxy compound, and an alicyclic epoxy compound.

16. The curable composition for a hard disk drive according to claim 10, wherein the component A2 is (a)an (meth)acrylic acid-modified compound of an epoxy compound.

17. The curable composition for a hard disk drive according to claim 10, wherein the weight ratio of the total of the component A1 and the component A2 to the total of the component A2 and the component A3 $\{(A1+A2)/(A2+A3)\}$ is 40/60 to 5/95.

18. The curable composition for a hard disk drive according to claim 10, wherein the weight ratio of the total of the component A1 and the component A2 to the component B $\{(A1+A2)/B\}$ is 99.9/0.1 to 90/10, and wherein the molar ratio of the epoxy group to the component C (epoxy group/C) is 75/25 to 45/55.

19. The curable composition for a hard disk drive according to claim 10, wherein the total amount of the components A1, A2, A3, B, and C in the curable composition is 80 to 100% by weight.

20. The curable composition for a hard disk drive according to claim 10, further comprising a tertiary amine compound.

* * * * *

UNITED STATES PATENT AND TRADEMARK OFFICE
CERTIFICATE OF CORRECTION

PATENT NO. : 10,059,838 B2
APPLICATION NO. : 14/415927
DATED : August 28, 2018
INVENTOR(S) : Yuta Hara It is certified that error appears in the above-identified patent and that said Letters Patent is hereby corrected as shown below:

At Column 12, Claim number 10, Line 61, the component "AZ" should read -- A2 --; and At Column 13, Claim number 10, Line 6, the word "thereto-radical" should read -- thermo-radical --.

Signed and Sealed this
Eleventh Day of December, 2018

Andrei Iancu
*Director of the United States Patent and Trademark Office*